United States Patent [19]

Lewus

[11] 4,295,538

[45] * Oct. 20, 1981

[54] AUXILIARY POWER SYSTEM FOR AUTOMOTIVE VEHICLE

[76] Inventor: Alexander J. Lewus, 9844 N. 11th Ave., Phoenix, Ariz. 85021

[*] Notice: The portion of the term of this patent subsequent to Nov. 25, 1992, has been disclaimed.

[21] Appl. No.: 76,081

[22] Filed: Sep. 17, 1979

Related U.S. Application Data

[63] Continuation of Ser. No. 926,373, Jul. 20, 1978, abandoned, which is a continuation of Ser. No. 812,528, Jul. 5, 1977, abandoned, which is a continuation of Ser. No. 633,825, Nov. 20, 1975, abandoned, which is a continuation-in-part of Ser. No. 453,293, Mar. 21, 1974, Pat. No. 3,921,746.

[51] Int. Cl.³ .............................................. B60K 25/10
[52] U.S. Cl. ................................ 180/165; 267/64.15; 417/231
[58] Field of Search ................ 180/165; 417/231, 233, 417/229, 230, 211; 267/65 R

[56] References Cited

U.S. PATENT DOCUMENTS

| | | | |
|---|---|---|---|
| 998,128 | 7/1911 | Smith | 417/231 |
| 1,116,293 | 11/1914 | Kane | 417/211 |
| 1,214,343 | 1/1917 | Matthews | 267/65 R |
| 1,905,941 | 4/1933 | Lansing | 417/231 |
| 2,194,530 | 3/1940 | Torstensson | 417/231 |
| 2,601,551 | 6/1952 | Navarro | 417/231 |
| 3,507,580 | 4/1970 | Howard | 417/231 |
| 3,559,027 | 1/1971 | Arsem | 180/65 R |
| 3,666,038 | 5/1972 | Hudspeth | 417/231 |
| 3,704,760 | 12/1972 | Maruyama | 180/302 |
| 3,921,746 | 11/1975 | Lewus | 180/165 |

*Primary Examiner*—John P. Silverstrim
*Attorney, Agent, or Firm*—Gregory J. Nelson

[57] ABSTRACT

A suspension and auxiliary power system for a vehicle having a frame, a power consuming load on said frame, and at least one supporting wheel which is adapted to move vertically relative to the frame. The system includes a fluid pump connected between the frame and the wheel and including a piston which is reciprocated in response to relative movement between the frame and wheel to contract or expand a fluid chamber. A fluid circuit connected to the pump includes a uni-directional fluid motor which drives a power consuming load. The fluid circuit is connected to the fluid chamber of the pump and includes a check valve for permitting fluid to flow only from the chamber directly to the motor. A second check valve in the circuit regulates flow so that fluid is directed only from a source of fluid to the chamber. The fluid pump acts as a hydraulic suspension system supporting at least a part of the vehicle weight whereby loading of the motor causes the motor to serve as a shock absorber for the pump.

5 Claims, 2 Drawing Figures

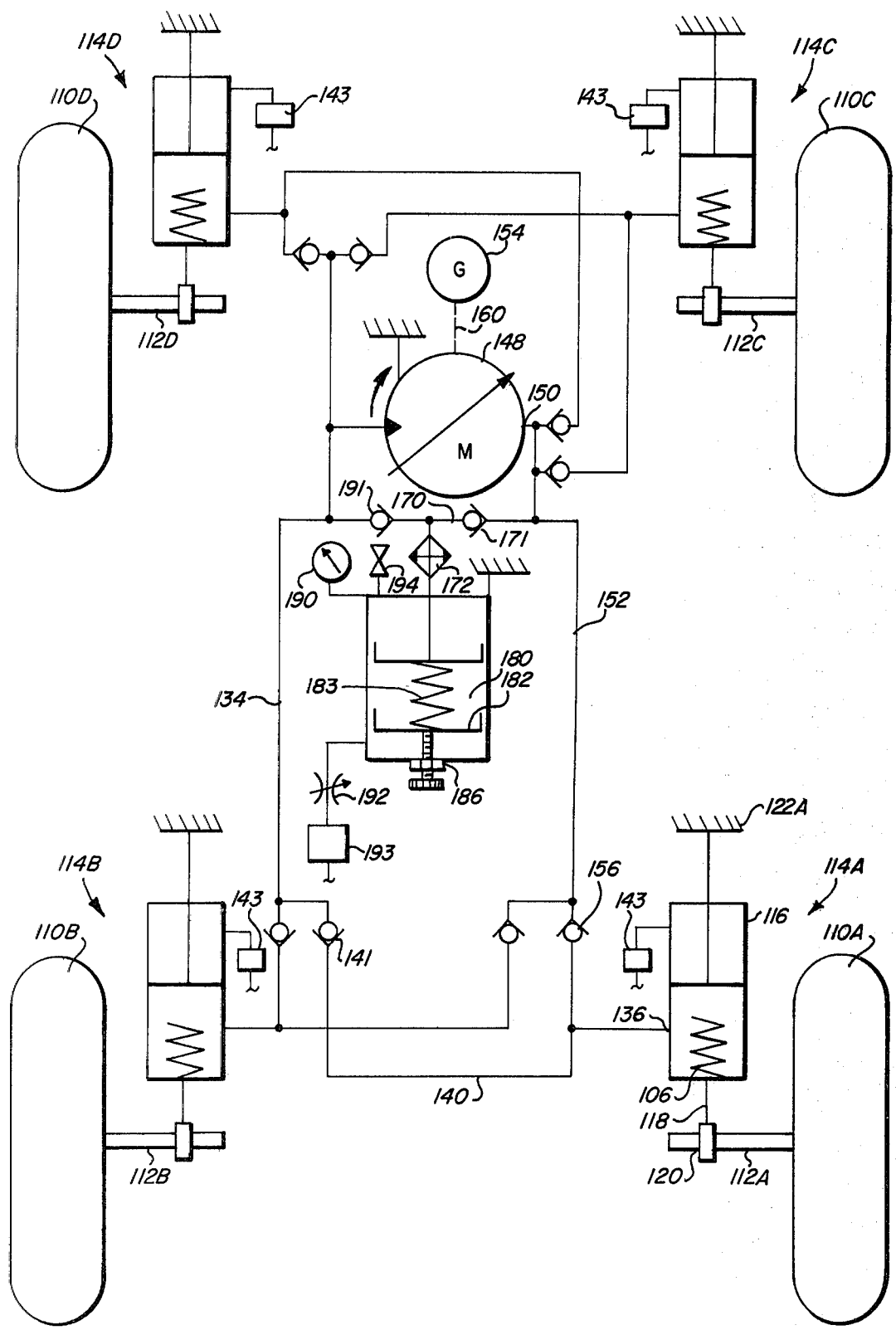

AUXILIARY POWER SYSTEM FOR AUTOMOTIVE VEHICLE

CROSS REFERENCE TO RELATED APPLICATION

This is a continuation of application Ser. No. 926,373 filed July 20, 1978 (now abandoned), which is a continuation of application Ser. No. 812,528, filed July 5, 1977 (now abandoned), which is a continuation of application Ser. No. 633,825 filed Nov. 20, 1975 (now abandoned), which is a continuation-in-part of application Ser. No. 453,293, filed Mar. 21, 1974 (now U.S. Pat. No. 3,921,746).

BACKGROUND OF THE INVENTION

Modern automobiles are equipped with a wide variety of different forms of auxiliary equipment, usually electrically powered. This auxiliary equipment may include ventilators and heaters, complete air conditioning systems, electrically operated windows and windshield wipers, and many other types of apparatus. Auxiliary equipment of similar variety and complexity is utilized in other vehicles, including trucks, railroad cars, and the like. Thus, railroad cars may be equipped with special heaters or cooling equipment; the same may apply to trailers and other vehicle types. Throughout this specification and in the appended claims, the term "vehicle" is employed in a generic sense to encompass ordinary automobiles, electric vehicles, trucks, railroad locomotives and cars, trailers, and off-road vehicles as well.

Of course, the power to operate a heater, blower air conditioner, or other electrical appliance, on any vehicle, must come from some source. The usual and conventional source is the engine that drives the vehicle. In some instances, as in certain railway lighting and heating equipment, the power may be derived from rotation of the wheels; in the long run, however, the actual source is still the vehicle engine, since this is what powers the rotating wheels. In many instances, the auxiliary equipment may constitute an appreciable power drain for the vehicle engine and may add materially to its cost of operation.

Similarly, electrically powered vehicles are becoming more common as an alternative to petroleum burning combustion engines. Electric vehicles are powered from storage batteries which are recharged during periods of non-use. The present invention can be adapted to such vehicles to generate electricity to recharge the batteries recovering energy otherwise wasted and the term "auxiliary equipment" includes such equipment.

Appreciable amounts of energy developed by many vehicles are completely wasted. The wheels of any vehicle moving over irregular terrain, or over terrain of changing contour, inevitably undergo appreciable vertical movement in addition to the desired movement across the terrain. Virtually all vehicles, at present, are equipped with springs and shock absorbers to minimize the vertical movements of the vehicle body, allowing limited vertical movement of the body relative to the vehicle wheels. These springs and shock absorbers must dispose of the energy represented by the vertical movements of the vehicle; the energy is ordinarily dissipated in the form of heat radiated to the surrounding atmosphere.

In one previous proposal, in Howard et al Pat. No. 3,507,580, a limited part of the energy of vertical movement of an electric automobile is salvaged and used to aid in driving the vehicle. The Howard et al patent provides a pneumatic pump, connected in parallel with a suspension spring for the vehicle, which pumps air into a pressure reservoir. The pressurized air from the reservoir is used to drive one or more pneumatic motors used to operate a battery charger, a starter, or the like.

SUMMARY OF THE INVENTION

A principal object of the invention, therefore, is to provide a new and improved integral power and suspension system that utilizes the energy potential of the vertical movements of an automotive vehicle, relative to the vehicle wheels, and converts that energy into a readily usable form for operation of auxiliary equipment on the vehicle.

A more specific object of the invention is to convert most or all of the vibratory and oscillatory vertical movements of an automotive vehicle, operating over terrain of irregular surface or of changing contour, into a form of energy that can be effectively employed for operation of auxiliary equipment on the vehicle, and at the same time to suppress the vertical movements of the vehicle body, affording effective shock absorption.

Another object of the invention is to adapt hydraulic or pneumatic shock absorbers for the generation of power output, in the course of normal operation of an automotive vehicle, without materially interferring with the shock absorption function.

Another object is to provide an improved auxiliary power and suspension system which recovers "free energy" otherwise lost and converts it to a usable form.

Another object is to provide an auxiliary electrical generating system which is particularly adaptable for recharging the batteries of electrically powered vehicles.

Another object of the invention is to provide a new and improved integral auxiliary power and suspension system which will replace the conventional springs and shock absorbers of automotive vehicles.

A particular object of the invention is to provide a new and improved suspension-actuated power system for an automotive vehicle, which converts the mechanical kinetic energy of vertical movements of the vehicle frame relative to the vehicle wheels into a readily usable form, that is economical in construction and effective in operation both for power generation and shock absorption.

Accordingly, the invention relates to a suspension-actuated auxiliary power system for an automotive vehicle or the like, comprising a vehicle frame, a body mounted on the frame, auxiliary power-driven equipment for the vehicle, and a plurality of supporting wheels for the vehicle. The auxiliary power system comprises suspension means for mounting the wheels on the vehicle frame, the suspension means allowing limited vertical movement of the wheels relative to the frame in response to irregularities and changes in contour of terrain traversed by the wheels. Power transmission means are provided, connected to at least two of the wheels and to the vehicle frame, for actuation in response to relative vertical movements between the wheels and the frame. Power conversion means are connected to and actuated by the power transmission means, converting the mechanical kinetic energy applied to the power conversion means through the power transmission means into hydraulic pressure energy and ultimately into electrical energy for more ready utilization in operation of the aforesaid auxiliary equipment.

BRIEF DESCRIPTION OF THE DRAWINGS

FIG. 2 is a schematic illustration of a suspension-actuated auxiliary power system constructed in accordance with a further embodiment of the invention.

DESCRIPTION OF THE PREFERRED EMBODIMENTS

Figure 1:
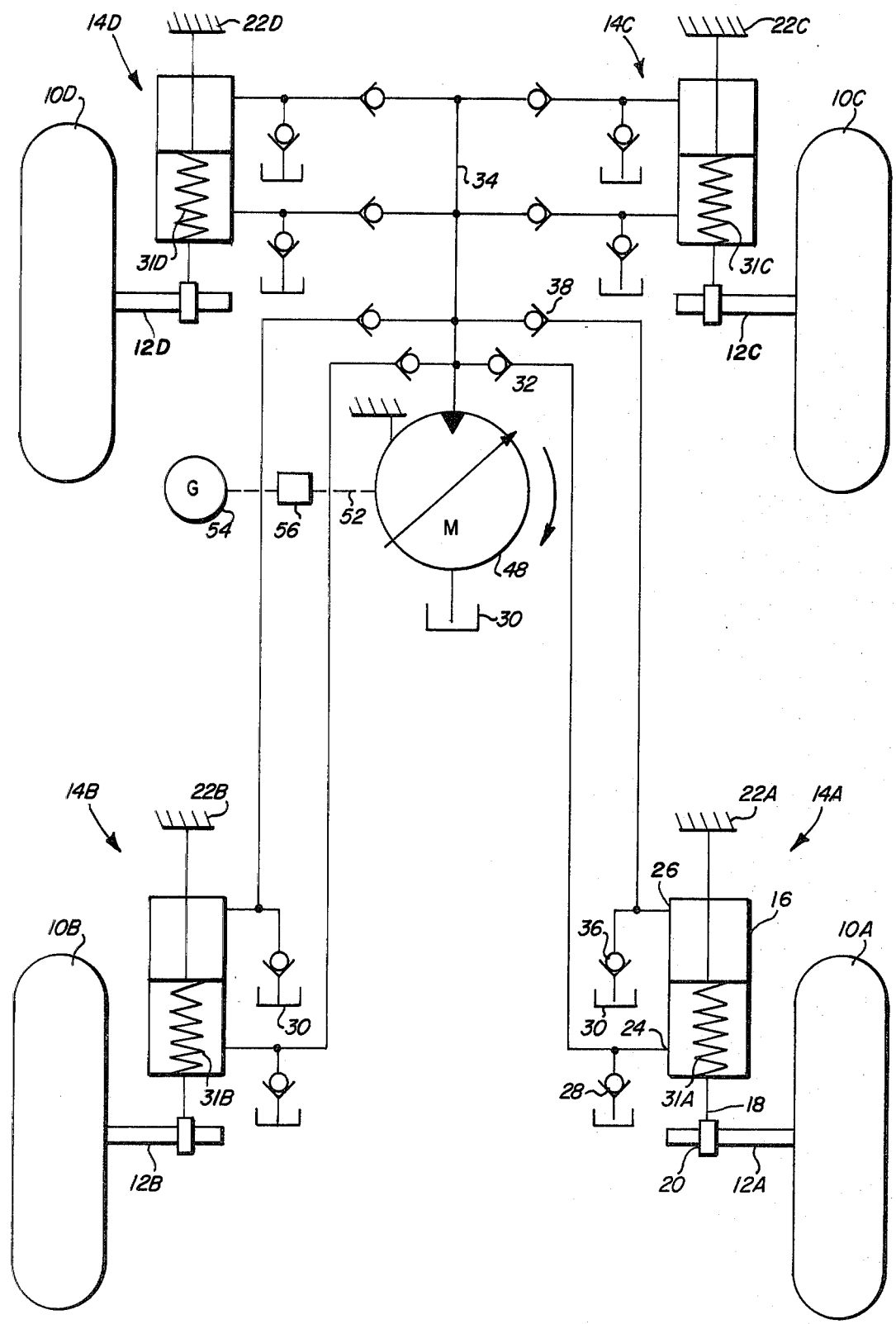
FIG. 1 is a schematic illustration of a suspension actuated auxiliary power system constructed in accordance with the present invention.

The apparatus schematically illustrated in FIG. 1 comprises the four wheels 10A, 10B, 10C and 10D of a vehicle, individually mounted on the vehicle axles 12A, 12B, 12C and 12D, respectively. A first major section 14A of the power system illustrated in FIG. 1, connected to wheel 10A, comprises a hydraulic pump 16 of the double acting cylinder type having cushioning or compression springs 31A in the lower cylinder chamber. A link 18 connects pump 16 to a bearing member 20 mounted on the axle 12A for wheel 10A. Pump 16 is also connected to a member 22A that is a part of the vehicle frame. Pump 16 has two ports 24 and 26, each of which serve as both an inlet port and an outlet port. Port 24 of pump 16 is connected to a check valve 28 that is returned to a system reservoir 30. Port 24 is also connected, through another check valve 32, to a main hydraulic transmission line 34. Similarly, port 26 is connected through one check valve 36 to the reservoir 30 and is connected through a second check valve 38 to the main hydraulic line 34.

The overall power system illustrated in FIG. 1 includes three additional sections 14B, 14C and 14D. Each of the power system sections 14B through 14D duplicates section 14A, so that no specific description of these sections is required. All sections of the power system are directly connected to the main hydraulic transmission line 34 which connects to the input of hydraulic motor 48 which may be of the gear, vane or similar type. The use of a single motor 48 powered by sections 14A to 14D serves to minimize the cost and complexity of the system.

The outlet port of motor 48 is connected to reservoir 30. Motor 48 has an output shaft 52 that drives an electrical generator 54. Shaft 52 may be connected to a speed changer 56 or transducer to step-up the shaft speed to meet the generator input requirements. The ultimate load for the system illustrated in FIG. 1 is the auxiliary equipment for the vehicle in which the system is incorporated.

In considering the operation of the system shown in FIG. 1, it may be assumed that the vehicle in which the system is incorporated is moving across a road or other terrain affording, as usual, a number of irregularities and changes in contour which are encountered by the individual wheels 10A-10D as the vehicle movement continues. Referring to section 14A of the power system, when wheel 10A encounters a bump or other rising contour in the road, the piston in pump 16 is driven upwardly, due to the relative movement between the wheel 10A and frame member 22A. The upward movement of the piston forces hydraulic fluid outwardly of port 26 and through check valve 38 into the main line 34. Furthermore, as the cylinder moves upwardly, fluid is drawn into pump 16 from reservoir 30 through check valve 28 and port 24.

When wheel 10A encounters a downward change in terrain and moves downwardly relative to frame member 22A, the reverse action occurs. Thus, hydraulic fluid is drawn from reservoir 30, through check valve 36 and port 26, into the upper portion of the pump cylinder. At the same time, fluid is forced outwardly of port 24 through check valve 32 into main line 34. The check valve arrangement, comprising valves 28, 32, 36 and 38, prevents pump 16 from pumping hydraulic fluid to the reservoir 30 and also prevents the pump from drawing fluid from line 34. The valving arrangement also insures fluid flow in one direction through line 34 and to motor 48 to operate the motor in one direction of rotation.

The same action occurs at each of the other power system sections 14B through 14D, as each of the wheels 10B through 10D moves vertically, upwardly or downwardly, with respect to the auxiliary frame members 22B through 22D. Thus, in each of the power system sections 14A through 14D, the vertical mechanical movement of the vehicle wheels is converted in form to the pumping of hydraulic fluid under pressure into line 34 in one direction of rotation. Spring 31A serves to prevent the cylinders from "bottoming out" and provide some dampening and suspension in cases of system failure and also supports the vehicle body in a rest position.

The fluid flow through line 34 causes actuation of motor 48 rotating output shaft 52. This drives electrical generator 54, converting the available power to electrical energy that is supplied to a battery or other load through the electrical controls 56.

In the complete four-wheel hydraulic system shown in FIG. 1, there are no springs directly interconnecting the vehicle wheels 10A-10D with the auxiliary frame members 22A-22D. In this system, each hydraulic pump 16 in direct interconnection with the motor 48 serves a dual purpose, functioning as both a spring and as a shock absorber, thus affording an all or part hydraulic suspension system. That is, the entire vehicle frame is suspended on the four double-acting cylinders when vertical movement is imparted to the vehicle. The major portion of the energy involved in the vertical movements of all of the wheels of the vehicle is converted to readily usable form, instead of being dissipated as heat as in conventional suspension apparatus. The use of a single motor supplied by multiple pumps is efficient and can be installed at low cost. System efficiency is high since frictional losses are minimized.

In the system of FIG. 1, it will be seen that the vehicle body is suspended on fluid and the vertical movement of the vehicle force fluid through the system. The hydraulic system directs the fluid across the motor to generate the motor in a single direction of rotation developing maximum energy output. When the motor is heavily loaded, the motor load also serves as a shock absorber for all cylinder pumps in the system, the motor load serving to dampen imparted forces. The system described can be pneumatic or hydraulic.

An alternate embodiment of the apparatus is schematically illustrated in FIG. 2 and includes vehicle wheels 110A, 110B, 110C and 110D, individually mounted on axles 112A, 112B, 112C and 112D, respectively. The first major section 114A of the power system, connected to wheel 110A, includes a hydraulic pump 116 of the single acting cylinder type. Compression springs 106 in the cylinder lower chamber serve to provide dampening in case of extreme road shock or would provide suspension in case of system failure. A link 118 connects pump 116 to bearing member 120 mounted on axle 112A for wheel 110A. Pump 116 is also connected to member 122A that is a part of the vehicle frame. Pump 116 has a single port 136 which serves as an inlet and outlet to and from the cylinder chamber. Line 140 connects with port 136 and main transmission line 134 across one-way check valve 141.

The upper cylinder chambers are in communication with ambient surroundings across an air filter 143 establishing a flow of air in operation. Only the lower cylinder chamber is used to produce energy. This design is believed economical and minimizes frictional losses.

The overall power system illustrated in FIG. 2, includes three additional sections 114B, 114C and 114D. Each of the power systems sections 114B through 114D duplicate section 114A, so no specific description of these other sections is required. All sections of the power system are directly connected to the main hydraulic transmission line 134 which connects to the input of hydraulic motor 148.

Motor 148 may be of the gear, vane or other type and is uni-directional in operation. The use of a single motor powered by multiple sections 114A to 114D serves to minimize the cost and complexity of the system and results in a highly efficient system with low frictional losses. Motor 148 utilizes the vertical movements of the vehicle to generate uni-directional fluid flow across motor 148 to produce high torque and energy output.

The outlet port 150 of motor 148 is connected by line 170 to the input of accumulator 180 having piston 182 and spring 183. Check valves 171 and 191 are interposed in line 170. Line 152 also connects the motor discharge with port 136 of pump 116. Check valve 156 is interposed in return line 152. The vehicle weight is, in effect, suspended on fluid in the cylinders and in the accumulator. All fluid discharged from the accumulator must be delivered to the motor 148 to actuate to the motor. Fluid is directed across check valve 191 which is a "recycling valve" preventing flow from the pumps directly to the accumulator. Supplemental hydraulic fluid may be added to the system to fill valve 194 which may be automatic. Gauge 190 provides a visual indication of system pressure.

Motor 148 has an output shaft 160 that drives an electrical generator 154. Shaft 160 may be connected to an appropriate speed changer or transducer to match the generator input speed to the output speed of motor 148. Generator 154 may be connected to an appropriate load such as an auxiliary system of the vehicle or may be used to charge vehicle batteries if the vehicle is an electrically powered vehicle.

Discharge port 150 from motor 148 communicates via line 170 with accumulator 180. Check valve 171 and an appropriate oil cooler 172 are provided in hydraulic line 170. The setting of accumulator 180 may be adjusted by turning handle 186 to vary the force exerted by compression spring 183 or against piston 182. The pressure in the lower accumulator chamber is controlled across pressured valve 192 and filter 193. It will be obvious that a gas or air accumulator may be used in place of the spring loader accumulator 180 shown. The fluid in the accumulator is under pressure at all times and supports vehicle body and frame at rest position.

The accumulator maintains a predetermined system pressure. The discharge from the outlet port 150 of motor 148 will flow either to the accumulator 180 via line 170 or to one of several of the cylinders 116 depending upon the pressure requirements of the system.

The advantage of the system shown in this figure is that the system is a closed loop system. The use of accumulator insures high starting and operational torque developed by motor 148. In other respects the system is generally operable as the system shown in FIG. 1. When one wheel encounters a change in terrain and moves downwardly relative to the frame member a pumping action occurs. If the piston moves upwardly relative to the frame, hydraulic fluid will be drawn from the outlet of the pump or the accumulator into the expanding cylinder chamber.

The design of the system shown in FIG. 2 achieves high torque output at the motor shaft. The system is a closed loop high pressure circuit with one motor connected, across appropriate valving, to an accumulator and several cylinder pumps. The fluid in the system supports the entire vehicle body weight. When any movement occurs, fluid is immediately forced by the cylinders across the motor to operate the motor in one direction of operation creating high torque at the motor output shaft.

Throughout the specification, the system has been described with reference to a hydraulic system. It will be appreciated that essentially the same system could be designed using pneumatic instead of hydraulic components. It is intended that the use of pneumatic is within the sphere and scope of the present invention. In this respect, any reference to hydraulics in this specification and appended claims should be construed to include pneumatic systems and components. By the same token, conversion to electrical energy can be accomplished through an AC generator as well as by means of a DC generator.

It will be obvious to those skilled in the art to make various alterations, modifications and changes to the invention herein described. To the extent that these alterations, modifications and changes do not depart from the spirit and scope of the invention claimed they are intended to be encompassed herein.

I claim:

1. A suspension and auxiliary power system for a vehicle having a frame, a power consuming load on said frame, and at least one supporting wheel adapted to move vertically relative to said frame, said system comprising: a fluid pump including a housing adapted to be connected to one of said frame and said wheel and a reciprocal piston adapted to be connected to the other of said frame and said wheel, said housing and piston forming at least one fluid pumping chamber whose volume is expanded and contracted by vertical movement between said frame and said wheel; a uni-directional fluid motor; said motor adapted to drive said power consuming load; and fluid circuit means connecting said chamber to said motor said circuit means including a first check valve for directing fluid only from said chamber directly to said motor and a second check valve for directing fluid only from a source of fluid to said chamber, whereby said pump acts as a fluid suspension system, supporting at least a part of the weight of said vehicle on said one wheel, and whereby the loading on said motor of said power consuming load causes said motor to act as a shock absorber to said pump.

2. The system of claim 1 wherein said fluid system is hydraulically actuated.

3. The system of claim 1 wherein said fluid system is pneumatically actuated.

4. The system of claim 1 wherein said chamber includes spring means biasing said piston at a predetermined position in a direction to cause said chamber to expand to prevent the piston from bottoming out at predetermined load conditions.

5. The system of claim 1 wherein said fluid circuit includes fluid pressure storage means.

* * * * *